Dec. 21, 1965   R. P. CARTER ETAL   3,225,256
ELECTRICAL PROTECTION SYSTEMS
Filed June 18, 1962

FIG. 4 (CO-ORDINATOR)

FIG. 5 (RECEIVER)

FIG. 6 (SQUARER)

FIG. 7
(STARTER)

FIG. 8 (DISCRIMINATOR)

FIG. 9 (OSCILLATOR)

FIG. 10 (DELAY CIRCUIT)

FIG. 11 (DELAY CIRCUIT)

Inventors!
Ronald Philip Carter
William Alan Cowin
Martin Clifford Hall
By: Stevens, Davis, Miller & Mosher
Attorneys

United States Patent Office 3,225,256
Patented Dec. 21, 1965

3,225,256
ELECTRICAL PROTECTION SYSTEMS
Ronald Philip Carter and William Alan Cowin, Stafford, and Martin Clifford Hall, Kidsgrove, Stoke-on-Trent, England, assignors to The English Electric Company, Limited, London, England, a British company
Filed June 18, 1962, Ser. No. 203,176
Claims priority, application Great Britain, June 20, 1961, 22,234/61
5 Claims. (Cl. 317—28)

This invention relates to an electrical protection system capable of discriminating between faults on a section of polyphase A.C. line protected thereby and faults outside the section, and adapted to isolate the section when a fault thereon has been detected.

According to one aspect of the invention an electrical protection system comprises equipment for installation at one end of a section of polyphase A.C. line to be protected and for connection by the said section, pilot lines or other means to similar equipment at the other end of the section, the said equipment including means for generating a carrier wave, means for cyclically modulating the amplitude of the said carrier wave by a modulating signal derived from the current at the said one end of the section, means for phase comparing the modulated carrier wave generated at the said one end with a modulated carrier wave received from the said other end and means adapted to perform a protective function in response to a predetermined minimum displacement from the normal phase relationship between the said modulated carrier waves.

Preferably the said modulating means include means for producing a substantially square wave for modulating the carrier wave and the frequency of modulation is preferably that of the current in the protected section. D.C. components in the signal used for modulating may be eliminated or reduced by a suitable filter.

According to a feature of the invention, a phase sequence network is provided which is adapted to produce a first output signal proportional to the positive phase sequence component of the current in the protected section at the said one end thereof, a second output signal proportional to the negative phase sequence component of the said current and a third output signal proportional to a predetermined combination of the said positive and negative phase sequence components, the said phase sequence network being so connected in the equipment that the said first and second output signals are supplied to relay starter means responsive thereto for starting the said phase comparison and the said modulating signal comprises the said third output signal from the phase sequence network.

Preferably the positive and negative phase sequence components are combined in such a manner to form the said third output signal from the phase sequence network that, after squaring in a suitable squaring circuit, the mark to space ratio of the square modulating signal is at least 0.98.

The said relay starter means may compirse a fault detector adapted to produce a D.C. signal responsive to the said second output signal from the phase sequence network and, if desired, to a predetermined increase and rate of increase of the said first output signal from the phase sequence network whereby the fault detector is made responsive to both unbalanced and symmetrical polyphase fault conditions.

Preferably the relay starter means also comprise a "low-set" and a "high-set" threshold device responsive to different values of the said second output signal, and increase of the said first output signal to enable portions of the equipment to be prepared for operation when the "low-set" values are reached whilst the protective function can only be performed when the "high-set" values are reached.

One form of phase comparison carrier protection system according to the invention will now be described, by way of example, with reference to the accompanying diagrammatic drawings in which.

Figure 1:
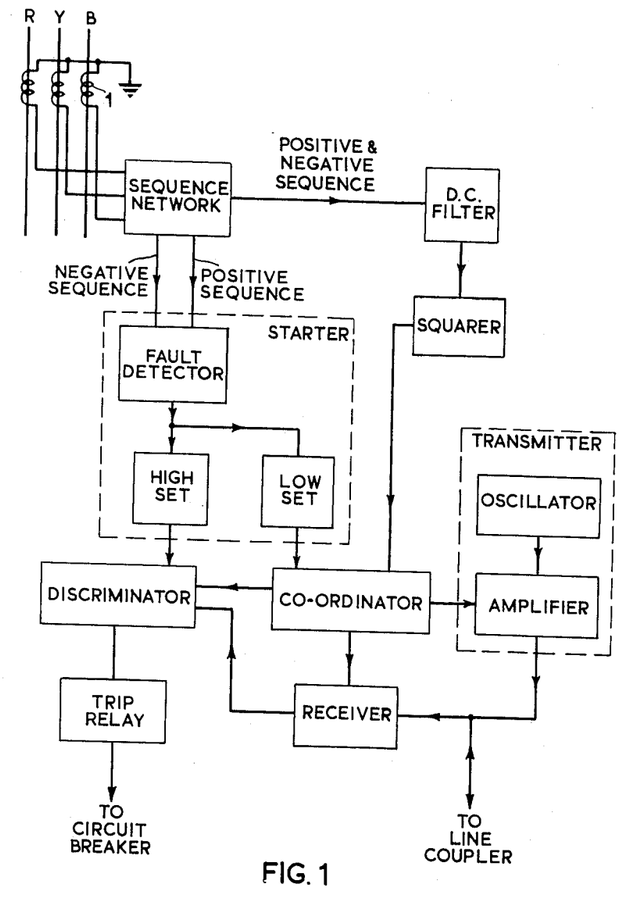
FIG. 1 is a block diagram of equipment for installation at one end of a section of 3-phase A.C. line to be protected by the system, the equipment for installation at the other end being identical and the two equipments being connected together by the section.

Referring to FIG. 1, the sequence network is supplied with input signals proportional to the line currents at one end of a protected section of a 3-phase power transmission line R, Y, B, through current transformers 1. The sequence network analyses these currents into their positive and negative phase sequence components and has three outputs, viz. a signal proportional to the positive phase sequence component, one proportional to the negative phase sequence component and a third signal proportional to a predetermined combination of the positive and negative phase sequence component.

The first two above-mentioned output signals are supplied to a starter and the third, through a D.C. filter for eliminating any D.C. components, to a squarer, which also incorporates a limiter and where the signal is converted into a square wave. The ratio of positive to negative phase sequence component fed into the squarer is so selected as to ensure that under fault conditions the amplitude of the output signal from the sequence network exceeds a threshold value necessary to give a square wave form of mark to space ratio as nearly as possible equal to unity.

The starter consists of a fault detector and a "low-set" and "high-set" threshold unit.

The fault detector, which also incorporates a limiter which assists in protecting the equipment from the effects of high voltages under severe fault conditions, is arranged to generate two D.C. signals which are respectively proportional to the negative phase sequence component and the increase in the positive phase sequence component; the output from the fault detector is the larger of these two D.C. signals. Thus, by reason of its response to the former, it detects phase unbalance and therefore any kind of fault except a balanced 3-phase fault and, by reason of its response to the latter, it is capable of detecting a balanced 3-phase fault and capable of distinguishing it with a high degree of certainty from a mere overload which would not be the case if it were responsive to an actual value, i.e. as opposed to an increase at a given rate of the positive phase sequence component.

The low-set and high-set threshold units of the starter are identical except that they are responsive to different values of output signal from the fault detector. The latter, which is set to a threshold 1.25 times that of the former, controls a discriminator and the low-set unit controls a co-ordinator which also receives the output from the squarer. The co-ordinator has three outputs, viz. to a transmitter, a receiver and the discriminator. The transmitter, which consists essentially of a high frequency oscillator for generating the carrier wave and an amplifier (the latter being the component controlled by the co-ordinator), is connected to the receiver, which is, in effect, a demodulator for the amplitude modulated carrier wave, through a line coupler at which the line from the corresponding equipment at the other end of the protected section is connected so that the receiver receives the modulated carrier waves from both equipments.

The discriminator is connected to a trip relay which promotes tripping of the circuit breaker at its own end of the protected section when, in the manner about to be described, the discriminator has established that a fault, detected by the fault detector, is located inside the section.

Figure 2:
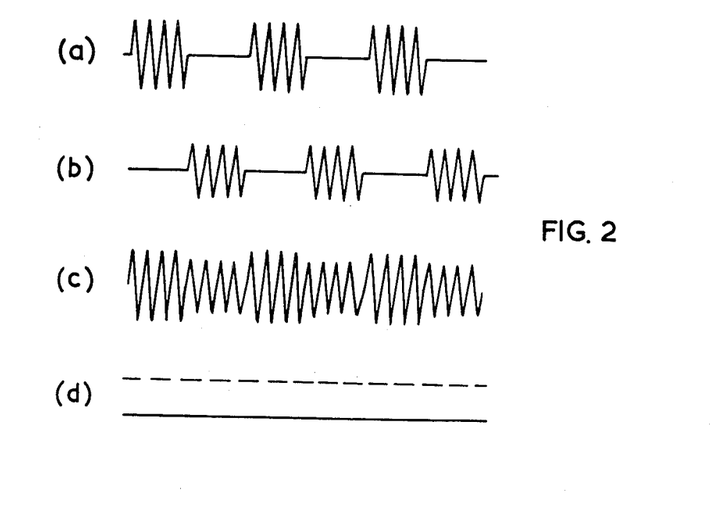
FIG. 2 shows the theoretical input and output signals (i.e. ignoring normal line phase shift) appearing at a receiver at either end of the protected section of line for fault external thereto.
Figure 3:
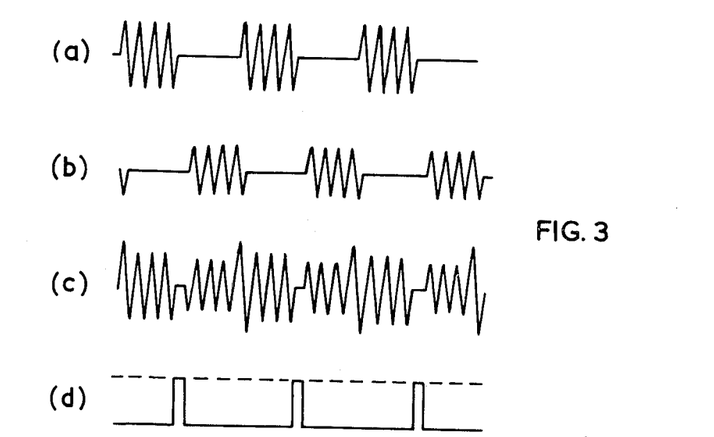
FIG. 3 shows the corresponding input and output signals appearing at a receiver at either end of the protected section of line for a fault on the protected section of line.

Before proceeding with a detailed description of the circuits shown in FIGS. 4 to 11, it is convenient to consider the operation of the complete system with the assistance of FIGS. 2 and 3. Hereinafter the two equipments at the ends of the protected section will, for convenience, be referred to as the "local" and "remote" equipment respectively and the same designation will be applied to the various components thereof and signals therefrom. Unless otherwise stated, the following description refers to the local equipment.

In the absence of a fault on the section, the equipment is in its quiescent state. Under the normal line conditions which produce this quiescent state there is neither a negative phase sequence component of line current nor an increase in positive phase sequence component and hence no starting signal is applied to the low-set and high-set threshold units from the fault detector. Hence neither of these units is actuated with the result that the discriminator is held inoperative by the latter unit and the co-ordinator by the former unit.

The oscillator of the transmitter is energized continuously but the latter's amplifier is controlled by the co-ordinator and kept switched off as long as the co-ordinator is kept inoperative under the control of the low-set threshold unit.

Under normal line conditions the output from the sequence network consists entirely of positive phase sequence component and the squarer receives a signal corresponding thereto from the sequence network through the D.C. filter, but the output from the squarer cannot reach the amplifier of the transmitter since it is blocked by the inoperative co-ordinator.

The same conditions apply to the remote equipment.

Since the discriminator, which controls the trip relay, is held inoperative, the latter remains de-energized and no tripping of the local circuit breaker takes place.

Upon the occurrence of a fault on the protected section, the fault detector responds to either the presence of a negative phase sequence component (in the case of any fault other than a balanced 3-phase fault) or the increase in the positive phase sequence component (in the case of a balanced 3-phase fault) and gives a D.C. output signal accordingly.

If this output signal from the fault detector is below the setting of the low-set threshold unit, the equipment remains in its quiescent state. If, on the other hand, the severity of the fault is such that the output signal from the fault detector exceeds the setting of the low-set threshold unit, then the latter renders the co-ordinator operative. The co-ordinator then renders the amplifier of the transmitter operative and also puts the squarer into communication with the amplifier, whereby the high frequency carrier wave generated by the oscillator is amplitude modulated by the power frequency square wave output from the squarer and the so modulated carrier wave is transmitted to the local receiver and also, via the line coupler and line, to the remote receiver.

Likewise, if the low-set threshold value of the remote fault detector has been exceeded, the remote equipment will operate in like manner and an amplitude modulated carrier wave will be received from the remote transmitter at the local receiver.

It is important to note that the current transformers 1 at the remote end are connected in antiphase relative to those at the local end so that the remote modulations are 180° out of phase with those at the local end.

The receiver demodulates the combined local and remote modulated carrier waves and this demodulated output signal from the receiver is fed into the discriminator. However, as previously mentioned, the discriminator, under the control of the high-set threshold unit, is inoperative as long as the fault detector output has not reached the high-set threshold value, so that, irrespective of the nature of the output signal from the receiver, the trip relay remains inoperative because of the blocking action of the inoperative discriminator.

If now the high-set threshold value is exceeded by the output signal from the fault detector, then the high-set threshold unit renders the discriminator operative. The latter then initiates operation of the tripping relay if the signal received from the receiver indicates that the fault is inside the protected section, in the manner to be described hereinafter.

It will be noted that, in FIG. 1, there is also a direct connection between the co-ordinator and the discriminator. This enables a stabilizing signal to be transmitted from the co-ordinator to the discriminator to neutralize the signal from the high-set threshold unit after a time interval sufficient for the operation of the trip relay by the discriminator, so as to render the equipment immune from the effects of transients in the protected section resulting from the opening of circuit breakers in adjacent sections. This stabilizing signal must remain applied until the back-up protection devices (e.g. time-overcurrent relays) in adjacent sections have had a chance to operate (e.g. 2.5 seconds), whereafter it is automatically removed. In order to provide for discrimination by the equipment in cases where provision is made for automatic re-closure, the stabilizing signal is also automatically removed upon the first opening of a circuit breaker on the protected section under fault conditions.

The direct connection between the co-ordinator and the receiver shown in FIG. 1 is for testing purposes only and will be referred to later when the testing facilities are described.

Reference will now be made to FIGS. 2 and 3, for the purpose of explaining the manner of the phase comparison upon which the operation of the equipment relies and the manner in which this phase comparison is utilized in the discriminator. The explanation relates to a section of line fed from both ends. For sake of simplicity, normal line phase shift has been ignored.

FIG. 2(a) shows the wave form of the amplitude modulated carrier transmitted by the local transmitter upon the occurrence of a fault of sufficient severity to operate the local low-set threshold unit. The square pulses generated by the squarer produce the gaps between blocks of high frequency carrier when the latter is modulated by the square pulses.

FIG. 2(b) shows the wave form of the similarly modulated carrier transmitted by the remote transmitter as received at the local line coupler under the same fault conditions and assuming that the remote low-set threshold unit has also been operated. The amplitude of the carrier wave is somewhat smaller than that shown in FIG. 2(a) because of line attenuation.

The phase relationship between the local and remote modulated carrier wave shown in FIG. 2 is that for a fault outside the protected section; therefore the two waves are in precise antiphase, by reason of the reversal of the remote current transformer secondaries, as hereinbefore mentioned.

The sum of these two modulated signals is shown in FIG. 2(c) and represents the wave form of the input signal to the receiver.

FIG. 2(d) shows the demodulated output signal from the receiver, i.e. the input signal to the discriminator. The important point to note is the fact that the signal is continuous in that it does not fall to zero, the gaps in the local signal being filled in by the remote signal and vice versa.

Referring now to FIGS. 3(a) to (d) which represent the same signals as shown in FIGS. 2(a) to (d), but for a fault inside the protected section, it will be seen that the local and remote modulated carrier waves shown in FIGS. 3(a) and 3(b) respectively are of exactly the same shape and amplitude as those shown in FIG. 2; however they are now relatively displaced in phase from their precise 180° antiphase relationship owing to the phase displacement between the currents at the two ends of the protected section and the consequent relative phase displacement of the local and remote modulating signals, with the result that the local modulated carrier signal no longer completely fills the gaps in the remote modulated carrier signal and vice versa.

The effect of this phase displacement on the output signal from the receiver is shown in FIG. 3(d), the significant portions of which are the gaps during which the signal is zero. Owing to normal line phase shift which, as previously mentioned, has so far been ignored in the consideration of the operation of the equipment, narrow gaps are always present in the receiver output signals when in operation, i.e. even upon the occurrence of an external fault and due allowance must be made for this phenomenon by adjusting the discriminator to respond only to a gap width in excess of a predetermined value.

As previously mentioned, the foregoing explanation applies to a section of line to which power is supplied from both ends. For such a case both the local and the remote fault detector will operate in response to any fault on the line, be it on the section or external thereto, and, if the fault is found to be an internal one, the circuit breakers at both ends of the section will trip under the action of their respective discriminators through their respective trip relays.

The conditions for a section of line fed from one end only can be easily deduced from the foregoing description and it will be seen that, whilst for an asymmetrical fault on the protected section or external thereto the operation of the equipment will be as hereinbefore described, the effect of an external symmetrical 3-phase fault will depend on whether this fault is located "upstream" or "downstream" of the protected section. Thus, if the fault is located "upstream" (i.e. between the source of power supply and the protected section), obviously neither the local nor the remote equipment will be brought into operation, whilst for an external symmetrical 3-phase fault "downstream" of the protected section the fault detectors at both ends will be operated because both will respond to the rise in positive phase sequence component and the phase comparison as per FIG. 2 will take place at both ends of the section. In the case of a symmetrical 3-phase fault on the section, however, the rise in positive phase sequence component accompanying such a fault will be detected only by the fault detector of the equipment at the "upstream" end of the section, i.e. nearest to the source of power, so that no carrier transmission, modulation or phase comparison, and therefore also no tripping, can take place at the other or "downstream" end. Clearly, at the "upstream" end, the result of the phase comparison and its effect on the discriminator will be the same as for a 180° phase shift, since the complete absence of transmission of carrier from the other end of the section will cause a gap in the demodulated output signal from the receiver of 180°.

From the foregoing, with particular reference to FIG. 3(d), it will be appreciated that, subject to the stabilizing signal hereinbefore referred to, the system provides one tripping pulse per cycle. Hence, at a modulation frequency equal to the power frequency of 50 cycles/sec., a tripping pulse is provided every 20 milliseconds.

A further feature of the system just described resides in the provision, in the positive phase sequence portion of the fault detector, of means for producing a voltage-time relationship which has a stepped rise and exponential decay characteristic. This portion of the fault detector and the high-set threshold unit are so designed that, upon the occurrence of a symmetrical 3-phase fault on the power line, the stepped rise in the signal generated by the fault detector is sufficiently great that the value of the subsequently exponentially decaying signal is still above the high-set threshold at the expiry of the time required for energization of the trip relay.

Figure 4:
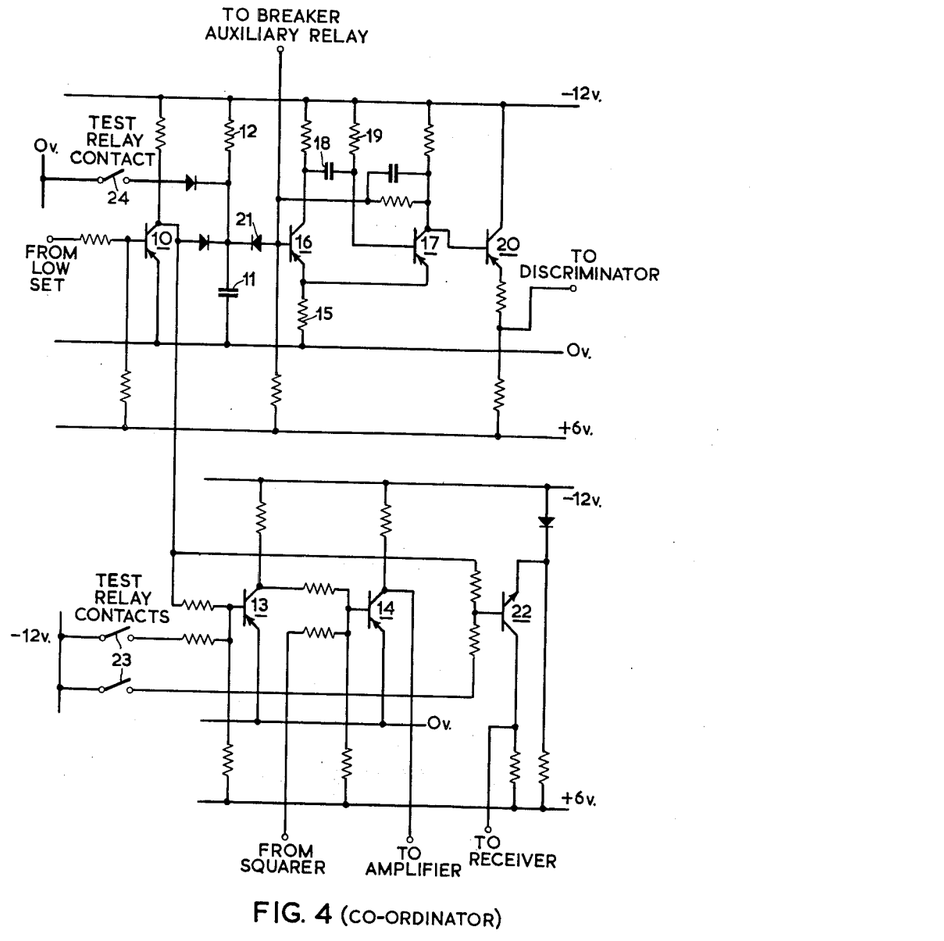
FIGS. 4 and 5 show respectively circuit diagrams of portions of the equipment known as the co-ordinator and receiver.

Referring now to the specific circuit arrangements of the various components of the equipment, FIG. 4 shows the circuit of the co-ordinator.

This component, as mentioned previously, is controlled by the low-set threshold unit and has the functions of allowing the squarer output to effect amplitude modulation of the high frequency carrier wave generated by the oscillator of the transmitter by switching the amplifier, and also of supplying a stabilizing signal to the discriminator after a time delay, as hereinbefore described. It also includes testing facilities which will be referred to in greater detail hereinafter.

When the low-set threshold unit picks up, the change of the latter's D.C. output signal at the base of the transistor 10, renders the transistor non-conductive, which in turn renders the transistor 13 conductive, thereby removing the bias from the base of the transistor 14 which enables the signal from the squarer to render the transistor 14 non-conductive intermittently and thus to modulate the carrier wave which is fed continuously from the oscillator to the amplifier of the transmitter.

At the same time the switching off of the transistor 10 allows the capacitor 11 to charge with a time constant dictated by the capacitor 11 and a resistor 12 in series therewith. When the voltage across the capacitor 11 cancels the bias across a resistor 15, the monostable circuit comprising transistors 16 and 17 and their associated components changes its state (i.e. the transistor 16 becomes conductive and the transistor 17 non-conductive) for a time controlled by a capacitor 18 and a resistor 19. The output from this circuit is applied to the discriminator via an emitter-follower stage, as the stabilizing signal hereinbefore referred to.

The emitter-follower stage comprises a transistor 20 and its purpose is to provide a signal at a level suitable for controlling the discriminator and to prevent the discriminator from loading the monostable circuit.

Removal of this stabilizing signal upon the first opening of a circuit breaker on the protected section in cases where provision is made for automatic reclosure of breakers, as hereinbefore referred to, is accomplished by connecting the base of the transistor 16 to the common of the circuit by contacts of a relay which is energized via auxiliary contacts of the circuit breaker when it opens for the first time. In this way, the monostable circuit is reset, the transistor 16 being rendered nonconductive and the transistor 17 conductive.

For balanced faults external to the protected section, the transistor 10 will, if the exponentially decaying starter signal drops below the low-set threshold level before the external breaker has opened, revert to the conducting stage, discharging the capacitor 11. In order to prevent the consequent unnecessary resetting of the monostable circuit, a diode 21 is connected in the base circuit of the transistor 16. Once the monostable circuit has picked up, the base of the transistor 16 is negative with respect to the circuit common so that, when the capacitor 11 discharges, the diode 21 becomes biased in the reverse direction and isolation is effected.

The operation of the testing facilities, such as the test relay contacts shown and a further transistor 22, will, as previously mentioned, be described later.

Other components of the co-ordinator circuit, being connected in a manner well known to electronic engineers, do not require special mention.

Figure 5:
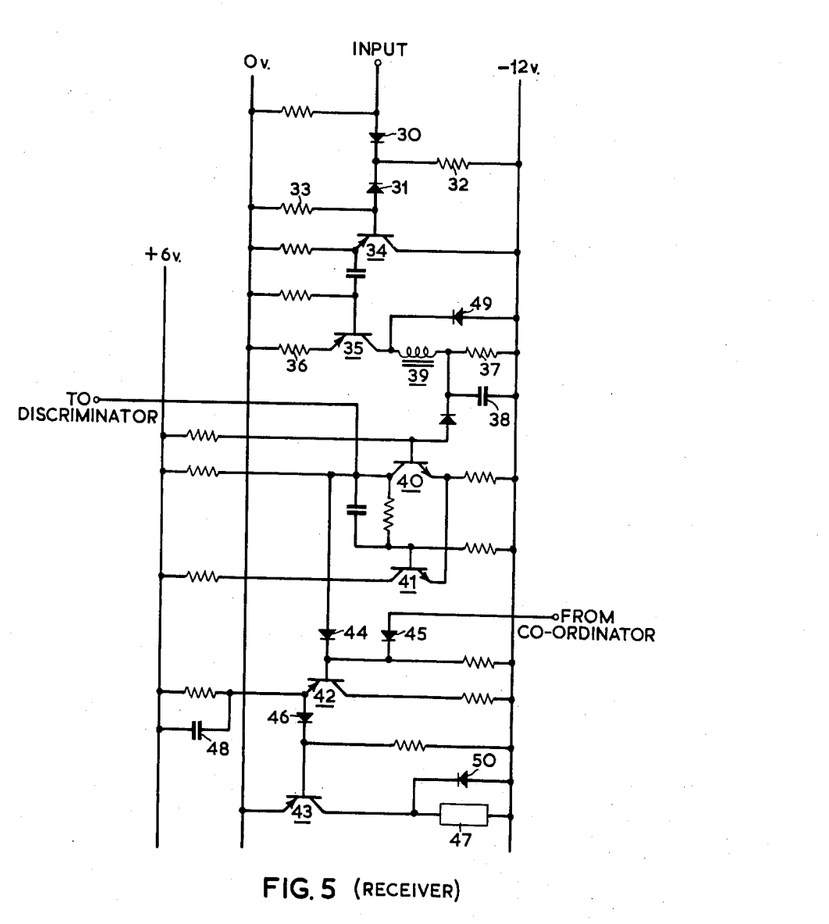

FIG. 5 shows the circuit of the receiver whose function is to demodulate the signal representing the sum of the modulated carrier waves from the local and remote transimitters, for feeding into the discriminator. Preferably the input to the receiver is first passed through a filter of conventional design.

In order to avoid damage to the input stage of the receiver and the necessity for arbitrary adjustment as between individual installations, diodes 30 and 31 and resistors 32 and 33 are provided for limiting the incoming signal. After passing through a buffer stage which includes a transistor 34 and associated circuitry, the signal is applied to an amplifier-detector stage consisting of a transistor 35 and associated components, the latter consisting of resistors 36 and 37, a capacitor 38 in parallel with the resistor 37 and an inductance 39 in series with the resistor-capacitor combination 37, 38. By means of the components 37, 38 and 39 the signal appearing at the collector of the transistor 35 is smoothed and the resulting D.C. voltage which appears across the capacitor 38 is applied to a Schmidt circuit consisting of transistors 40 and 41 and the usual associated components, causing this Schmidt circuit to change its state when the transistor 40 is switched on by the input signal. Consequently the output from the collector of the transistor 40 which is applied to the discriminator is representative of the input signal to the receiver.

Two further stages, incorporating transistors 42 and 43 are provided but these are only effectively employed under test conditions, to be referred to later, although they do operate in response to a carrier wave received from the remote transmitter. For signals from the local transmitter, the transistor 42 remains in its normal state by reason of diodes 44 and 45 since, as the input to the diode 44 goes negative from its normal positive voltage the input to the diode 45 goes positive.

For a carrier wave received from the remote equipment, on the other hand, when the diode 44 goes negative, the transistor 42 conducts and its emitter goes negative to apply a reverse bias to a further diode 46 such that the transistor 43 is switched on and a relay 47 is operated.

If the incoming carrier wave is modulated, the transistor 42 switches on and off at a rate of 50 cycles per second and, in order to prevent the relay 47 from following this oscillation, a capacitor 48 is provided and arranged to charge while the transistor 42 is conducting and to maintain sufficient charge during the non-conducting period of the transistor 42 whereby the transistor 43 is kept switched on.

Diodes 49 and 50 are provided for fulfilling the usual desirable protective function for inductive circuits.

Figure 6:
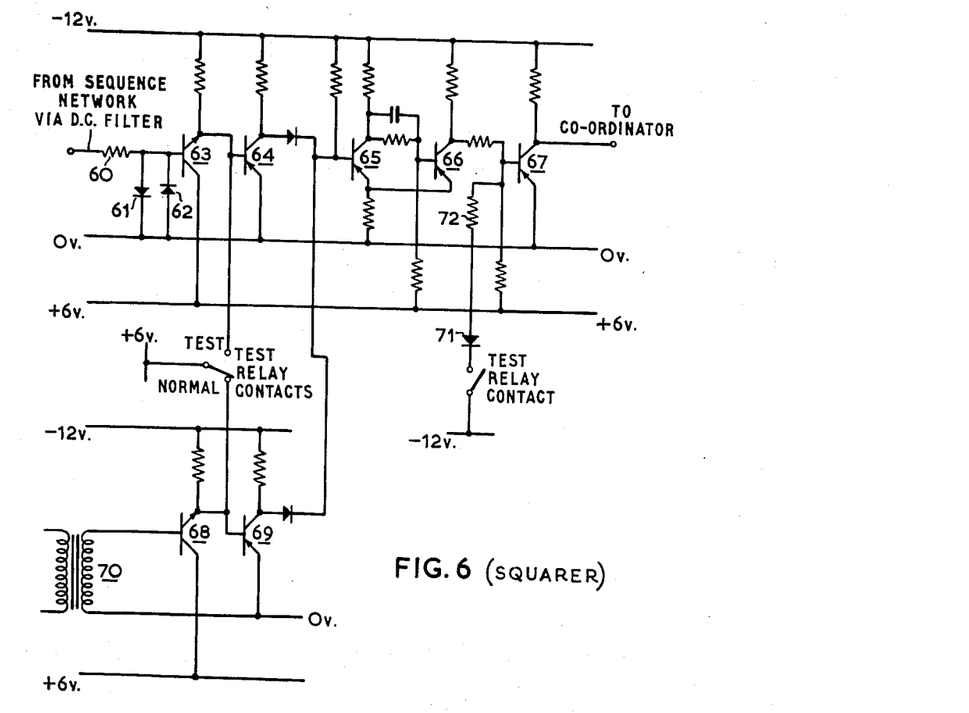
FIGS. 6 to 8 show respectively circuit diagrams of portions of the equipment known as the squarer, starter and discriminator.

Referring to FIG. 6, this shows the circuit of the squarer which, as previously mentioned, also incorporates a limiter. The function of the squarer is to produce a square wave at power frequency with a mark-to-space ratio as near as possible to unity for small alternating voltage inputs.

If an alternating voltage is used to switch a p-n-p transistor in the common emitter configuration, due to the forward voltage drop across the emitter-base junction, switching actually takes place about a level slightly negative to the potential to which the emitter is tied. For very large input signals, provided that adequate limiting is incorporated in the base circuit, this fact is not significant, but for signals of small magnitude there may be a considerable error in the mark-to-space ratio of the resulting square wave.

To minimize this error, some means of biasing the input is required. This can be achieved by preceding the p-n-p transistor by an emitter follower stage including an n-p-n transistor, provided that both transistors are made of the same element. Both germanium and silicon transistors can be used, but germanium, having a lower forward voltage drop across its p-n junction, is more suitable. Alternatively, an emitter follower stage including a p-n-p transistor and followed by a common emitter stage including an n-p-n transistor could be used, as long as both transistors are made of the same element.

The input signal for the squarer is derived from the sequence network via a D.C. filter which may be of conventional design.

The limiting function is performed by a circuit arrangement consisting of a series resistor 60 and two oppositely poled diodes 61, 62 across the input terminals. For best results, the type of element from which the transistors and diodes are made must be considered. Thus, if germanium transistors are used, ordinary silicon diodes are satisfactory since the forward voltage drop across a silicon diode is of sufficient magnitude to switch a germanium transistor. However, where silicon transistors are used, low voltage Zener diodes are required for limiting in order to achieve satisfactory switching of the transistors.

Germanium transistors 63 and 64 and their associated components form a basic squaring circuit. The p-n-p transistor 64 changes its state when its base is slightly negative with respect to its emitter because of the small potential required at a p-n junction to cause it to conduct in the forward direction. For the same reason there is a small potential difference between the base and emitter of the transistor 63, but by making this latter transistor of the n-p-n type, this potential difference is such that when its base is at the potential to which the emitter of the transisor 64 is connected, its emitter is ideally at the negative potential level at which the transistor 64 can change its state. Hence the slightest change of potential from the common potential level at the input to the transistor 63 causes the transistor 64 to change its state and the resultant square wave at the collector of the transistor 64 will have a mark-to-space ratio the same as that of the applied alternating sinusoidal voltage.

A precise match of the characteristics of these transistors will, in practice, rarely be obtained, but the diversion from the ideal is only of differential order and for all practical purposes only a very small change in input potential will cause a change of state of the transistor 64.

For small alternating input voltages the voltage drop across the resistor 60 introduces a slight error in the mark-to-space ratio. However, the error introduced is not significant. The value of the resistor 60 depends upon the rating of the diodes 61 and 62. In practice the arrangement is such that even without careful matching of the transistors, limiting can be achieved for extremely large voltages and a mark-to-space ratio of the square wave obtained which is better than 0.98 over a range of temperatures in excess of that over which the equipment would normally be required to operate.

The basic squaring circuit of the transistors 63, 64 is followed by a Schmidt circuit consisting of transistors 65 and 66 and their associated components, for speeding up the rise and fall times of the incoming square wave. A further transistor 67 is provided for amplifying the output signal from the Schmidt circuit so as to give it sufficient magnitude to effect modulation of the power amplifier via the co-ordinator.

The testing facilities, which will be referred to in greater detail later, include a basic squaring circuit similar to that hereinbefore described and including two transistors 68 and 69 similar to the transistors 63 and 64 respectively.

The transistors 68, 69 are supplied from a main transformer 70. The transistors 68, 69 are connected to the transistors 63, 64 via suitable test relay contacts and, likewise, test relay contacts are provided for connecting a D.C. input to the transistor 67 via a diode 71 and a resistor 72. Thus, under normal conditions, the transistor 69 is kept switched off so that the transistor 65 can be switched by the transistor 64, whilst, under test conditions, the transistor 64 is kept switched off so that the transistor 65 can be switched by the transistor 69.

The limiter-squarer described is capable of producing a square wave with the aforesaid mark-to-space ratio of better than 0.98 over a very wide temperature range over a range of input signal amplitudes of up to 350:1.

Figure 7:
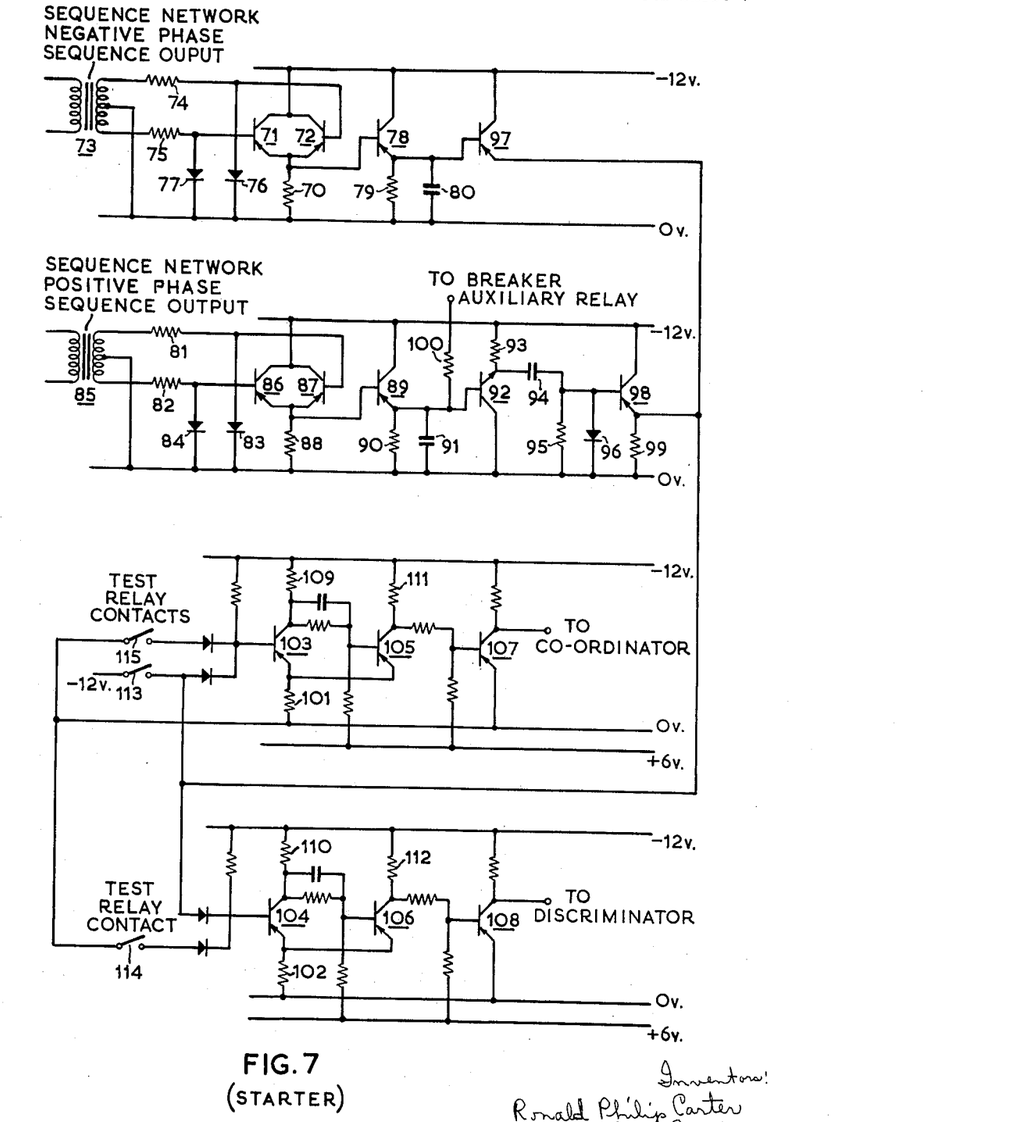

FIG. 7 shows the complete starter circuit, of which the top half is the fault detector and the lower half the low-set and high-set threshold units.

Referring first to the fault detector, this is made up of two sub-circuits which are adapted to respond independently to the negative and positive phase sequence components of line current derived from the sequence network and whose outputs are applied to the threshold units through an "or" gate.

The function of the first sub-circuit, which derives its input from the negative sequence output of the sequence network, is to produce a negative D.C. output voltage for controlling the low-set and high-set threshold units when an alternating signal appears at its input terminals due to an unbalanced fault on the power line.

The function of the second sub-circuit, which is responsive to the increase in positive phase sequence component of line current supplied by the sequence network, is to produce a negtive going D.C. voltage in accordance with the increase in the magnitude of the alternating input signal due to a balanced 3-phase fault on the power line. It will be appreciated that, whereas an input signal to the first sub-circuit of the fault detector is present only under unbalanced fault conditions, an input signal to the second sub-circuit, representing as it does the positive phase sequence component will be present even under healthy line conditions when the line is energized.

During heavy fault conditions both the negative and the positive phase sequence output voltages from the sequence network can assume very large values and, with a view to protecting the equipment from damage, it is therefore highly desirable to provide means for limiting the input signals to the electronic circuits. Such limiting is greatly facilitated by the use of transistorized emitter follower stages for rectification which enable the use of a simple circuit utilizing a zener diode and a series resistance for the limiting stage.

In the first sub-circuit, viz. that driven from the negative phase sequence output of the sequence network, a rectified voltage appears across a resistor 70 representing the common load of an emitter follower stage comprising two transistors 71 and 72. The circuit arrangement is such that the output from the sequence network is applied to the electronic circuitry via a transformer 73 with a centre-tapped secondary so that two signals in antiphase are applied to the bases of the transistors 71, 72. Limiting is applied to each half of the secondary winding of the transformer 73 by resistors 74 and 75 and zener diodes 76 and 77. During the positive half-cycle of an alternating wave the appropriate zener diode 76, 77 conducts in the forward direction and on the negative half-cycle it breaks down at a predetermined value below the H.T. potential of the circuit. Consequently the bases of the transistors 71, 72 can only go negative and they do so during alternative half-cycles of the input signal so that the resultant output voltage across the resistor 70, representing the output from this full-wave rectifier, is negative.

This rectified output is fed to a further emitter follower stage consisting of a transistor 78, a resistor 79 and a capacitor 80 where the signal is smoothed. The transistor 78 is provided to prevent distortion of the input signal to the sub-circuit.

In the second sub-circuit, viz. that driven from the positive phase sequence output of the sequence network, resistors 81 and 82 and zener diodes 83 and 84 provide a limiting stage in the same way as components 74 to 77 in the first sub-circuit and likewise there is again provided an input transformer 85 with a centre-tapped secondary winding, a transistorized emitter follower stage consisting of two transistors 86 and 87 with a common load resistor 88, and a further transistorized emitter follower stage consisting of a transistor 89 with an output resistor 90 and a capacitor 91 connected across it for smoothing purposes. The D.C. output from this latter stage is fed into a further emitter follower stage consisting of a transistor 92 and load resistor 93 which provides isolation between the capacitor 91 and a further capacitor 94 during the onset and detection of a fault. Any change in the magnitude of the input to this sub-circuit from the sequence network appears as a change in the smoothed D.C. signal which, because of the capacitor 94, appears as an exponentially decaying step voltage across a resistor 95, the last-mentioned voltage having a leading edge corresponding to the change in the magnitude of the input signal and the exponentially decaying portion of the wave form having a time constant dictated by the product of the capacitance of the capacitor 94 and the resistance of the resistor 95. A diode 96 is connected across the resistor 95 to ensure that the output is never positive, as might otherwise be the case for decreases in the input signal to the sub-circuit.

The aforesaid "or" gate is provided by a transistor 97 in the first-mentioned sub-circuit and a transistor 98 and resistor 99 in the last-mentioned one. This gate is connected to the low-set and high-set threshold units so that they can pick up for both unbalanced and balanced faults on the power line.

The purpose of providing this "or" gate in the form of two emitter followers with a common load is to prevent the fault detector circuit being excessively loaded when the low-set and high-set threshold units pick up.

The circuit parameters are so chosen that at the protective setting of the system the output from the negative phase sequence responsive sub-circuit just causes the high-set unit to pick up and the output from the positive phase sequence component responsive sub-circuit causes the high-set unit to pick up for a time long enough for the trip relay to be energized.

For fault currents at levels much greater than the protective setting of the system the exponentially decaying output from the positive phase sequence responsive sub-circuit will tend to stay at a level above the high-set threshold value for a time which may extend well beyond the tripping time of a circuit breaker. It therefore becomes desirable to be able to reset this sub-circuit so that it can respond to and increase in input signal if the breaker is automatically reclosed; otherwise a balanced 3-phase fault which had not been cleared when the circuit breaker opened would not be detected on reclosure. This resetting facility may conveniently be provided by an auxiliary relay contact on the circuit breaker, the arrangement being such that upon opening of the circuit breaker a relay is energized which causes the capacitor 91 to be connected to the common supply line of the circuit via a resistor 100, thereby discharging the capacitor 91 and consequently also the capacitor 94 through the transistor 92.

It is noteworthy that, if the transistor 92 were of the p-n-p type, the rapid connection of the resistor 100 to the common potential of the system would tend to cut the transistor 92 off, since the capacitor 94 would not respond to a sudden change of potential but remain negative with respect to the common potential. Special arrangements would then have to be provided for discharging the capacitor 94 in a short time since, in this case, the emitter load resistor 93 would be in the discharge circuit of the capacitor 94. By making the transistor 92 of the n-p-n type, as shown, when its base is made to go positive by connecting the resistor 100 to the common potential, the transistor 92 becomes more conducting and the capacitor 94 discharges very quickly independently of the value of the emitter load resistor 93.

The function of the low-set and high-set threshold units is to provide the fault settings at which the equipment is put into operation and respectively to render the co-ordinator and the discriminator operative when these fault settings or threshold levels of the operating signals are exceeded.

From the lower portion of FIG. 7 it will be noted that the circuits of these two units are identical, the only difference between them being the values of the resistors 101 and 102. The required ratio between the fault settings of the two units is achieved by making the resistor 102 in the high-set unit greater than the resistor 101 in the low-set unit. This ratio, usually 1.25:1, is chosen so as to ensure that the low-set units at both ends of the protected section pick up before either of the high-set units, so as to prevent false tripping for marginal faults external to the protected section.

Each unit includes a Schmidt circuit consisting of two transistors 103 (or 104) and 105 (or 106) and their normal associated components, followed by an amplifying stage including a transistor 107 (or 108), for providing a signal of sufficient magnitude to be capable of switching subsequent circuits of the equipment. The units change their states when the D.C. output from the fault detector cancels the voltage normally developed across the resistor 101 (or 102) when the transistor 105 (or 106) is conducting. By making the collector load resistor 109 (or 110) of the transistor 103 (or 104) greater than the load resistor 111 (or 112) of the transistor 105 (or 106) the units will revert to their original state at a D.C. input level lower than that which was initially required to change them from this state. This feature is of particular significance when the output from the fault detector is the exponentially decaying step function provided by its positive phase sequence portion, and more especially so when the magnitude of the step is just equal to the level required to change the state of the high-set unit. Without this differential effect tripping could not be effected under marginal conditions, since the high-set unit would only change to the operational state for a time of shorter duration than the minimum charging time of the trip angle capacitor in the discriminator which will be hereinafter referred to with reference to FIG. 8.

The other circuit components shown in the drawing and not specifically herein referred to perform the usual functions well known to those skilled in the art, and the test relay contacts shown are part of the testing facilities to be described later.

Figure 8:
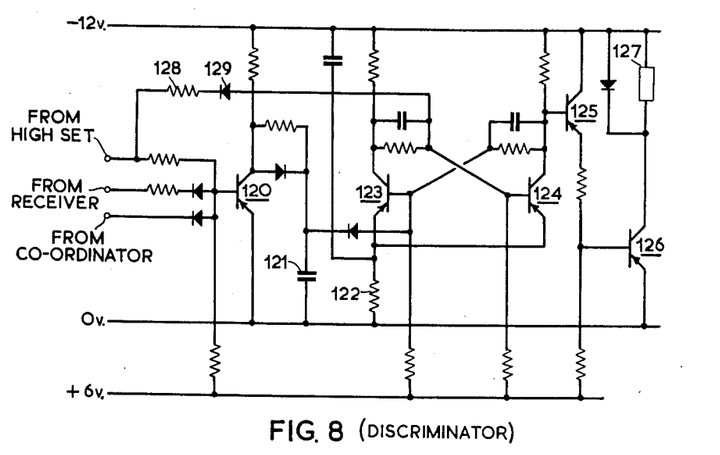

FIG. 8 shows the circuit diagram of the discriminator. Its function, as the name implies, is to discriminate between faults on the protected section and faults external thereto, and it does so by responding appropriately to the output signal from the receiver which, representing as it does the demodulated combination of the modulated carrier waves transmitted from the local and the remote transmitter, is dependent on the phase relationship between the line currents at the two ends of the protected section. The discriminator therefore determines whether the phase difference between the predetermined mixture of positive and negative phase sequence components produced by the sequence networks at the two ends of the protected section is less or greater than that which is permissible for stability and, if greater, provides a tripping signal for energizing the trip coil of the circuit breaker at the end of the protected section concerned, via the trip relay.

As previously mentioned in the description of the operation of the protective system as a whole, the discriminator is controlled by three input signals derived respectively from the high-set threshold unit of the starter, the co-ordinator and the receiver.

When the power line is healthy (i.e. when the fault level is below the high-set threshold value) a negative potential is applied from the high-set threshold unit, whilst the potentials derived from the receiver and the co-ordinator are positive with respect to the earth line of the discriminator circuit. Consequently the circuit is under the control of the high-set threshold unit and a transistor 120 is maintained in its conducting state.

Upon the occurrence of a fault on the power line of sufficient severity to operate the low-set threshold unit, the input signal to the discriminator from the receiver which, as hereinbefore described, is representative of the phase difference between the line currents at the two ends of the protected section, becomes negative during the periods when the carrier wave is received, reverting to its positive polarity during the intervals (if any) when, due to a phase shift between the said line currents, the modulation of the carrier wave causes the latter to be reduced to zero.

If the severity of the fault is sufficient to operate the high-set threshold unit, the latter picks up and thereafter the discriminator comes under the control of the inputs from the receiver and the co-ordinator. Ignoring for the time being the effect of the input signal from the coordinator (which will be described hereinafter), the input signal from the receiver causes the transistor 120 to be switched off once in every cycle of the modulating frequency (i.e. every 20 milliseconds for 50 c.p.s. power frequency) if there are "gaps" in the receiver output signal, as hereinbefore described, and to remain switched off for cyclically recurring periods of time corresponding to the widths of these "gaps" and hence for periods corresponding to the phase difference between the currents at the two ends of the protected section.

Due to the fact that there is a normal phase shift along any transmission line, the mere presence of these "gaps" is not by itself indicative of a fault condition and the discriminator must therefore be capable of distinguishing between normal phase shift and excessive phase shift, the latter due to the presence of a fault. The discriminator is therefore given a phase angle setting according to the length of the protected section and arranged to give a tripping signal when the width of these "gaps" exceeds a predetermined value.

This is achieved by providing the circuit with an appropriate time constant and, for a given phase angle setting, the value of a capacitor 121 which is arranged so as to be able to charge up towards the negative high tension potential of the circuit when the transistor 120 is switched off, is so chosen that the voltage across it rises to a value sufficient to give a tripping signal in a time corresponding to the minimum width of the said "gap" for which the discriminator is adjusted to operate. The voltage across the capacitor 121 is applied to a bi-stable circuit, consisting of transistors 123 and 124 and their associated components, the said bi-stable circuit changing its state when the voltage across the capacitor 121 just cancels the bias applied across a resistor 122 of this circuit.

For faults on the power line external to the protected section, the transistor 120 is never off long enough for the capacitor 121 to charge up far enough for the bi-stable circuit to change its state, but for faults inside the protected section, the bi-stable circuit, which converts a single tripping pulse into a continuous change of potential level, picks up. The bi-stable circuit is followed by an emitter-follower stage including a transistor 125, the output from which is applied to the base of a further transistor 126 forming an amplifier output stage which is adapted to energize a relay 127 which in turn is adapted to operate the trip relay connected to the discriminator. Thus, picking-up of the bi-stable circuit results in an output signal from the discriminator which is used to trip the circuit breaker with which the equipment is associated.

When the fault is cleared, the bi-stable circuit is reset by a negative going potential as a result of the high-set threshold unit dropping out, via a resistor 128 and a diode 129.

The third input signal to the discriminator, viz. that from the co-ordinator, is a stabilizing signal which, as hereinbefore described, the co-ordinator applies after a time delay, to guard against mal operation of the equipment in response to transients caused by the clearance of external faults. By controlling the transistor 120, this input prevents the discriminator from operating whilst circuit breakers on other sections of the power line are opened.

One of the important features of the discriminator described is that, for faults within the protected section, tripping is accomplished within one complete cycle from the end of the first of these gaps (see FIG. 3) following fault incidence.

Figure 9:
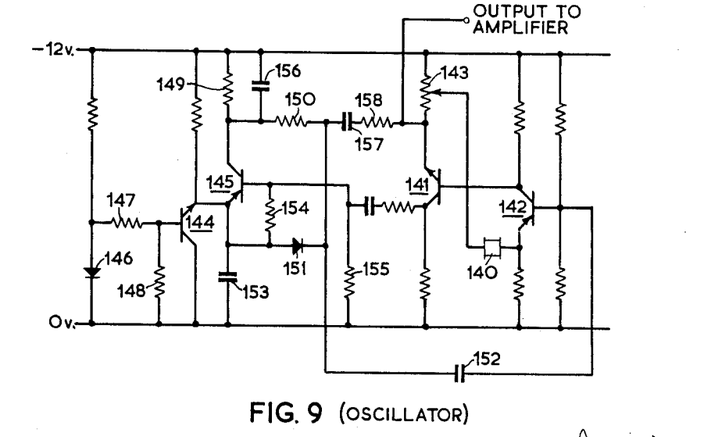
FIG. 9 shows the circuit diagram of the oscillator which, together with an amplifier, forms the transmitter.

FIG. 9 shows the circuit of the radio frequency crystal oscillator which, together with the amplifier (not shown), forms the transmitter.

The oscillator basically consists of two parts, namely the aperiodic crystal oscillator proper and an amplitude stabilization control circuit.

The oscillator proper consists of a crystal 140, an emitter follower stage including an n-p-n type transistor 141 and its asociated components, and a common base stage including a p-n-p type transistor 142 and its associated components.

At its series resonant frequency the crystal 140 appears as a resistance of low value. Positive feedback takes place round a loop containing the collector of the transistor 142, the base and the emitter of the transistor 141, a potentiometer 143, the crystal and the emitter of the transistor 142, and sinusoidal oscillation takes place.

The use of a common base stage and an emitter follower stage enables these oscillations to be obtained with a minimum number of transistors. By making the transistor 141 of the n-p-n type correct D.C. levels are maintained in the circuit.

The potentiometer 143 controls the positive feedback and amplification within the circuit and oscillations can be maintained at any frequency over a very wide range, the frequency being determined by the characteristics of the crystal employed.

The amplitude stabilization control circuit consists basically of two transistors 144 and 145 and their associated components; its function is to provide negative feedback to the oscillator proper, when the oscillator output reaches a predetermined level. This level is determined by the bias potential on the emitter of the transistor 145 which is also the emitter potential of the emitter follower buffer stage comprising the transistor 144. This potential is determined by the zener voltage of a zener diode 146 and a resistor chain 147, 148. By making the transistor 147 of the n-p-n type a very stable reference potential is achieved since, when the transistor 145 conducts, its emitter current does not flow through the emitter load of the transistor 144 as it would if the latter were of the p-n-p type.

The values of the resistors 147, 148 depend on the level at which limiting is required, the rating of the zener diode 146 available and the characteristics of the amplifier to which the oscillator is connected; the said resistors must be adjusted accordingly and may under certain circumstances be dispensed with altogether.

A path is provided from the negative supply line through resistors 149 and 150, a diode 151 and the transistor 144 to the earth line, the diode 151 being biased in the forward direction and therefore normally conducting.

The base of the transistor 142 of the oscillator proper is normally decoupled via a capacitor 152, the conducting diode 151 (which appears as a low impedance) and a further capacitor 153. The collector of the transistor 141 of the oscillator proper forms no part of the positive feedback loop. Instead it is used as the input to the amplitude stabilizing circuit. Thus, for oscillations of small amplitude appearing at the collector of the transistor 141, the transistor 145 is held in the non-conducting state by the bias applied to its base from the potential divider consisting of resistors 154 and 155, but when the output rises above the level at which limiting is required, the larger swing at the collector of the transistor 141 causes the transistor 145 to conduct for small periods of a cycle. The resultant rectified current is smoothed by a capacitor 156 and the junction of the resistor 150 and a capacitor 157 becomes less negative; the diode 151 is thereby rendered less conducting (viz. its impedance increases) and consequently the decoupling of the base of the transistor 142 becomes less effective. At the same time negative feedback is applied to the base of the transistor 142 from the emitter of the transistor 141 via a resistor 158 and the capacitors 157 and 152, and limiting occurs. The larger the output from the oscillator tries to become, the greater becomes the portion of a cycle over which the transistor 145 conducts and, by reason of the progressive cutting-off of the diode 151, the negative feedback applied to the base of the transistor 142 increases with the result that the amplitude of the oscillator output is stabilized at the predetermined value.

One of the advantages of the oscillator described is that it can operate over a wide band of frequencies depending upon the particular frequency of the crystal used. By adjusting the potentiometer 143 until limiting occurs, the output from the oscillator may be controlled at a constant amplitude at any frequency within the operating range.

The test facilities for the protection system which have already been referred to in the description of the various circuits will now be described comprehensively. They are such that certain parts of the equipment can be tested whilst in service and certain further parts require the equipment to be out of service.

Miniature electromagnetic relays (not shown) are used to provide the multiplicity of contacts required for carrying out the tests.

The scheme of testing is based on the principle that the equipment at one end of the protected section acts as "master station" whilst that at the other end acts as a "slave station." Both master and slave stations contain identical apparatus but the master station uses certain relays not used by the slave station and vice versa. A "station selector link" (not shown) is used which, by its insertion into appropriate sockets by connecting the relays to the remainder of the equipment as required, renders one equipment the master station and the other the slave station. For convenience of description, the local and remote equipment will hereinafter be deemed to be respectively the master and slave station.

With the equipment in service, the limited test which can be carried out makes possible checking of the transmission channel, whilst at the same time it also checks the squarer, transmitter, receiver and that portion of the co-ordinator which controls modulation of the carrier wave.

The test is initiated at the local equipment by pushing a button, which must be held in for the duration of the test, namely half a second, subsequent operations being carried out automatically. Referring to FIG. 4, the closing of test relay contacts 23 in the co-ordinator causes the transistor 13 to be switched on and the transistor 22 to be switched off, so that the output from the squarer, which, under normal healthy line conditions is, in the absence of a negative phase sequence component, a pure positive sequence quantity derived from the sequence network, is permitted to modulate the transmitter. Switching off the transistor 22 prevents the carrier receive relay 47 of the receiver (FIG. 5) from operating during the transmission interval caused by the modulation. This modulation is allowed to continue for 100 milliseconds. When the burst of modulated carrier is received by the remote equipment, the carrier receive relay 47 of the remote receiver (FIG. 5) operates to start a relay sequence. At a predetermined time after the end of the received pulse, the remote co-ordinator (FIG. 4) is energized to allow transmission of modulated carrier back to the local equipment for a further 100 milliseconds. When this signal is received at the local equipment, its carrier receive relay 47 (FIG. 5) operates to initiate a further sequence and a visual indicator (not shown) gives a "test correct" indication. If carrier fails to return to the local equipment within half a second from the initiation of the test, the test is automatically terminated and a visual "test fail" indication is given.

If a fault occurs on the power line at any time during the test, the respective low-set threshold units take over control of the local and remote co-ordinators and fault discrimination takes place exactly as if no testing were in progress.

With the equipment out of service, a more comprehensive test can be carried out. This is, in fact, an extension of the limited test by means of which not only the transmission channel but also certain other electronic circuits can be tested.

For the purpose of such a test the modulating signal is supplied by the auxiliary voltage transformer 70 shown in FIG. 6.

The test is initiated at the local equipment by the same push button as the limited test. Test relay contacts 113 and 114 in the starter (FIG. 7) close to operate the low-set threshold unit for 100 milliseconds and modulated transmission is thereby permitted during this period. At the same time the monostable circuit in the co-ordinator (FIG. 4) is prevented from operating by the closing of a test relay contact 24 in the co-ordinator. Consequently no stabilizing signal is applied to the discriminator. This is necessary in order to leave the discriminator free to operate later in the test. When the signal arrives at the remote equipment, operation of the carrier receive relay 47 in its receiver (FIG. 5) actuates the high-set threshold unit of the remote starter, when the contact 113 and a further test contact 115 (FIG. 7) close, which allows the remote discriminator to operate its carrier trip relay 127 (FIG. 8). The relay 127 controls the subsequent transmission from the remote to the local equipment for 100 milliseconds. When this signal arrives at the local station, the carrier receive relay 47 in the local receiver (FIG. 5) actuates the local high-set threshold unit and subsequently the carrier trip relay 127 and the local discriminator (FIG. 8) to energize the "test correct" indicator via the appropriate relay. As in the previously described limited test, if no carrier arrives at the local equipment within half a second, the "test fail" indicator is operated.

The sequence network, D.C. filter and starter can be checked by injecting an alternating current into the sequence network from a standard relay secondary injection set.

Additional tests can be carried out with the equipment out of service to check the transmitter into a dummy load at either the local or remote equipment, or the channel between the two equipments, when it is necessary to make measurements on the signal received at a particular equipment. By pushing the appropriate button, modulated or continuous carrier can be used. If a modulated signal is required, the co-ordinator (FIG. 4) is made operational by the test relay contacts 23, and if a continuous signal is required the output from the transmitter is made to be continuous by closing a test relay contact 73 in the squarer (FIG. 6), when the co-ordinator (FIG. 4) becomes operational.

If desired, provision may also be made for periodically initiating a limited test, by controlling the appropriate contacts by a clock and it will be appreciated that the equipment lends itself readily to remote control and/or indication, if desired.

In connection with the test facilities described, miniature electromagnetic relays are used as a simple means for providing the multiplicity of contacts required. Two of these relays are required to have delayed operation whilst another is required to have delayed release when initiation is performed mechanically.

Figure 10:
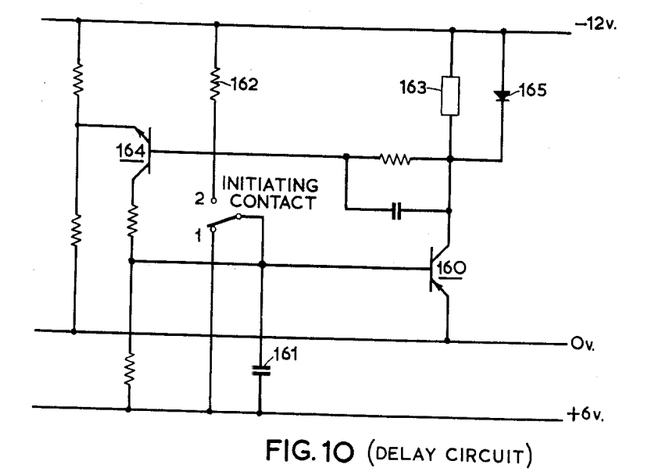
FIGS. 10 and 11 show delay circuits provided for testing purposes.

FIG. 10 shows a suitable circuit for providing this delay relay operation. In FIG. 10, a transistor 160 is normally switched off. When the initiating contact changes from position 1 to position 2, a capacitor 161 charges up and after a time determined by the time constant of the series combination of this capacitor with a resistor 162, the voltage across the capacitor 161 causes the transistor 160 to switch on to operate a relay 163. The components described so far are sufficient to achieve a delay of the order required but the switching action is relatively slow and the rated power dissipation of the transistor 160 might be exceeded.

For this reason a second transistor 164 is provided in order to render the circuit regenerative with the result that the switching action is always fast after the required time delay. By making this transistor 164 of the n-p-n type and the transistor 160 of the p-n-p type both transistors are normally switched off and the resulting circuit is therefore very economical.

When the initiating contact returns to position 1, the capacitor 161 immediately discharges and the regenerative action of the circuit causes the relay 163 to be de-energized very rapidly.

Figure 11:
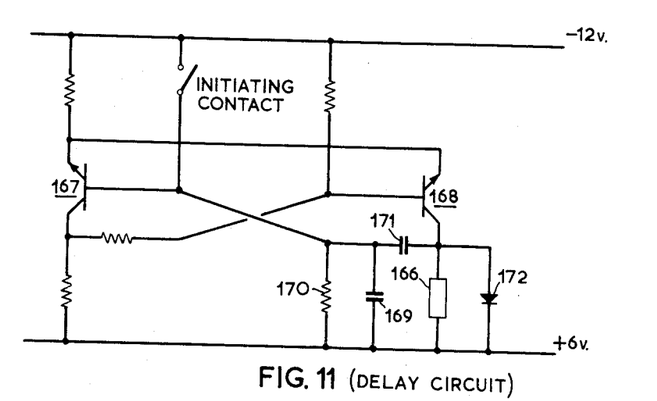

FIG. 11 shows a circuit for providing delayed release of a relay 166. Here again the regenerative technique is employed but this time a transistor 167 is arranged to be normally conducting whilst a second transistor 168 is switched off. When the initiating contact closes, the transistor 167 is switched off, the transistor 168 is switched on and the relay 166 operates rapidly. At the same time a capacitor 169 charges up. When the initiating contact opens, the charge on the capacitor 161 is sufficient to hold the transistor 167 switched off but the capacitor 169 will discharge through a resistor 170 and after a predetermined time the transistor 167 will switch on again and, due to the regenerative effect of the circuit, the transistor 168 will switch off to deenergize the relay 166. The desired time delay is obtained by suitable choice of the capacitor 169 and the resistor 170.

A further capacitor 171 is provided to prevent the capacitor 169 from discharging through the operating coil of the relay 166.

In the circuits of FIGS. 10 and 11 a diode 165 and 172 respectively is provided across the relay 163 and 166 respectively for preventing large reverse voltages being developed across the relay operating coil.

The use of a combination of n-p-n and p-n-p transistors in a regenerative circuit reduces the power consumption of the circuit appreciably where both transistors are normally in the non-conducting state. Moreover switching in regenerative circuits employing such a combination of transistors is faster than in circuits which employ either two n-p-n or two p-n-p type resistors.

What we claim as our invention and desire to secure by Letters Patent is:

1. An electrical protection system for protecting a section of polyphase alternating current power supply line, comprising equipment for connection to one end of the said section of line, similar equipment for connection to the other end of the said section of line, means for interconnecting the two equipments, the said equipment including means for generating a carrier wave, modulating means for cyclically modulating the amplitude of the said carrier wave by a modulating signal derived from the current in the said one end of the section, phase comparing means for phase comparing the said modulated carrier wave with a corresponding modulated carrier wave received from the said similar equipment and for generating pulses whose lengths are dependent on the extent of the instantaneous displacement, if any, from the normal phase relationship between the two compared modulated carrier waves, such displacement indicating the presence of a fault on the line, measuring means for measuring the length of each said pulse and means adapted to perform a protective function when the length of a pulse exceeds a predetermined minimum length indicative of a predetermined minimum phase displacement.

2. A system according to claim 1, in which the equipment includes a phase sequence network adapted to produce a first output signal proportional to the positive phase sequence component of the current in the protected section at the said one end thereof, a second output signal proportional to the negative phase sequence component of the said current and a third output signal proportional to a predetermined combination of the said positive and negative phase sequence components of the said current, the equipment including also relay starter means connected to receive the said first and second output signals and to then initiate the said phase comparison, the said modulating signal being constituted by the said third output signal from the phase sequence network.

3. A system according to claim 2, in which the relay starter means comprises a fault detector arranged to produce a D.C. signal in response to the said second output signal from the phase sequence network.

4. A system according to claim 3, in which the fault detector is also arranged to produce a D.C. signal in response to a predetermined increase and rate of increase of the said first output signal from the phase sequence network.

5. A system according to claim 4, including a "low-set" and a "high-set" threshold device responsive respectively to different levels of the said D.C. signal, the "low-set" threshold device being responsive to a relatively low level of the D.C. signal and initiating the said modulating means, and the "high-set" threshold device being responsive to a relatively higher level of the said D.C. signal and initiating the said phase-comparing means and the said measuring means.

References Cited by the Examiner

UNITED STATES PATENTS

| | | | |
|---|---|---|---|
| 1,930,333 | 10/1933 | Bancker | 317—28 |
| 2,419,904 | 4/1947 | McConnell | 317—28 |
| 2,879,454 | 3/1959 | Hodges et al. | 317—28 |
| 3,031,588 | 4/1962 | Hilsenrath | 307—88.5 |
| 3,050,636 | 8/1962 | Sommerfield | 307—88.5 |

SAMUEL BERNSTEIN, *Primary Examiner.*

LLOYD McCOLLUM, MAX LEVY, *Examiners.*